United States Patent
Moriwaki et al.

(10) Patent No.: US 7,487,434 B2
(45) Date of Patent: Feb. 3, 2009

(54) TRANSCEIVER MODULE

(75) Inventors: Shohei Moriwaki, Tokyo (JP); Yoshifumi Azekawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 720 days.

(21) Appl. No.: 11/171,201

(22) Filed: Jul. 1, 2005

(65) Prior Publication Data
US 2006/0067358 A1 Mar. 30, 2006

(30) Foreign Application Priority Data
Sep. 30, 2004 (JP) ............................. 2004-287842

(51) Int. Cl.
*G06F 11/00* (2006.01)
*G08C 25/00* (2006.01)
*H03M 13/00* (2006.01)
*H04L 1/00* (2006.01)

(52) U.S. Cl. ........................... 714/799; 370/463

(58) Field of Classification Search ................. 714/799; 370/463
See application file for complete search history.

(56) References Cited

U.S. PATENT DOCUMENTS 7,346,764 B2 * 3/2008 Moriwaki et al. .............. 713/1
2006/0107138 A1 * 5/2006 Moriwaki et al. ........... 714/724

OTHER PUBLICATIONS

"A Cooperation Agreement for 10 Gigabit Ethernet Transceiver Package Issue 3.0", XENPAK MAS Rev 3.0, Sep. 18, 2002, Internet URL:<http://www.xenpak.org/MSA/XENPAK_MSA_R3.0.pdf>, pp. 1-77.

* cited by examiner

*Primary Examiner*—Guy J Lamarre
(74) *Attorney, Agent, or Firm*—Leydig, Voit & Mayer, Ltd.

(57) ABSTRACT

A transceiver module is provided with a transceiver IC (PHY IC) having an XENPAK register group including an status register, and a DCU having an XENPAK register group which emulates the XENPAK register group. The PHY IC has an operation mode in which it does not reply to access to the XENPAK register group by a host while the DCU emulates the structure and function of the XENPAK register group.

3 Claims, 1 Drawing Sheet

TRANSCEIVER MODULE

BACKGROUND OF THE INVENTION

1. Field of the Invention

The present invention relates to a transceiver module for optical communications.

2. Description of Related Art

There have been provided transceiver modules for optical communications which are compliant with the IEEE802.3ae standard, for example. A transceiver compliant with the IEEE802.3ae standard includes, for example, an NV (Non-Volatile) register, a DOM (Digital Optical Monitoring) register, an LASI (Link Alarm Status Interrupt) register, etc. which are XENPAK (common specifications of optical connectors and optical transceivers which operate according to the XAUI (10 Gigabit Attachment Unit Interface) protocol adopted by 10 Gbit Ethernet (registered trademark) defined by the IEEE802.3ae standard) (refer to nonpatent reference 1, for example).

A related art transceiver IC (referred to as a PHY IC from here on) which constitutes such a transceiver module mentioned above has both an IEEE register which is used when carrying out communications processing and an XENPAK register which is defined by the above-mentioned standard, those registers being implemented via hardware. As error-associated registers which belong to those registers, there exist interrelated registers (i.e., LASI_Status registers) holding the same contents in the IEEE registers and XENPAK registers, respectively.

In the related art transceiver module, when a change is made to the structure and function of either the IEEE register or the XENPAK register, it is necessary to perform the design and development of the PHY IC again so that the structure and function of the register meet new specifications.

On the other hand, when the structure and function of the XENPAK register which is built in the PHY IC is software-emulated by a device control unit (referred to as a DCU from here on) which is an IC for controlling the PHY IC and other peripheral functions, the structure and function of the XENPAK register can be changed by changing a software program of the DCU which emulates the structure and function of the XENPAK register.

A problem is however that since the DCU software-emulates the structure and function of the XENPAK register, when a host which is a higher-layer device accesses to the XENPAK register via MDIO, a reply output from the XENPAK register in the existing PHY IC collides (or mingles) with a reply output from an XENPAK register of the DCU which emulates that of the PHY IC.

While information about a high-speed error which is detected only by the PHY IC and which is associated with communications processing is stored in a register to which information about an error that occurs in the XENPAX register of the PHY IC can be set, information about a low-speed error which is detected only by the DCU and which is associated with internal processing is stored in a register to which information about an error that occur in the XENPAK register of the PHY IC can be set. Another problem is therefore that a mismatch occurs between the contents of the register associated with errors (i.e., an LASI_Status register) in the PHY IC and those in the DCU.

SUMMARY OF THE INVENTION

The present invention is made in order to solve the above-mentioned problems, and it is therefore an object of the present invention to provide a transceiver module in which a DCU emulates registers of a PHY IC, and, when a higher-layer device accesses to an XENPAK register of the PHY IC, a reply output from the XENPAK register in the existing PHY IC can be prevented from colliding (or mingling) with a reply output from an XENPAK register of the DCU which emulates that of the PHY IC, thereby canceling a mismatch between the contents of the registers in the PHY IC and those in the DCU, which is caused by the occurrence of a high-speed error which is detected only by the PHY IC and occurrence of a low-speed error which is detected only by the DCU.

In accordance with the present invention, there is provided a transceiver module including: a physical-layer integrated circuit having a physical-layer register unit including an error flag register to which a bit value indicating occurrence of an error; and a control integrated circuit having a control-side register unit which emulates the structure and function of the physical-layer register unit, the physical-layer integrated circuit having an operation mode in which it does not make a reply to access to the physical-layer register unit thereof by a higher-layer device while the control integrated circuit emulates the structure and function of the physical-layer register unit.

In accordance with the present invention, the transceiver module includes the physical-layer integrated circuit having the physical-layer register unit including the error flag register to which a bit value indicating the occurrence of an error; and the control integrated circuit having the control-side register unit which emulates the structure and function of the physical-layer register unit, the physical-layer integrated circuit having an operation mode in which it does not make a reply to access to the physical-layer register unit thereof by the higher-layer device while the control integrated circuit emulates the structure and function of the physical-layer register unit. Therefore, the present invention offers an advantage of being able to, when the higher-layer device accesses to the physical-layer register unit-of the physical-layer integrated-circuit, prevent a reply output from the physical-layer register unit in the existing physical-layer integrated circuit from colliding (or mingling) with a reply output from the control-side register unit of the control integrated circuit which emulates the physical-layer register unit, thereby canceling a mismatch between the contents of the physical-layer register unit of the physical-layer integrated circuit and those of the control-side register unit of the control integrated circuit, which is caused by the occurrence of a high-speed error which is detected only by the physical-layer integrated circuit and which is associated with communications processing, and occurrence of a low-speed error which is detected only by the control integrated circuit and which is associated with internal processing such as monitoring of a laser for transmission.

Further objects and advantages of the present invention will be apparent from the following description of the preferred embodiments of the invention as illustrated in the accompanying drawings.

DETAILED DESCRIPTION OF THE PREFERRED EMBODIMENTS

Embodiment 1

Figure 1:
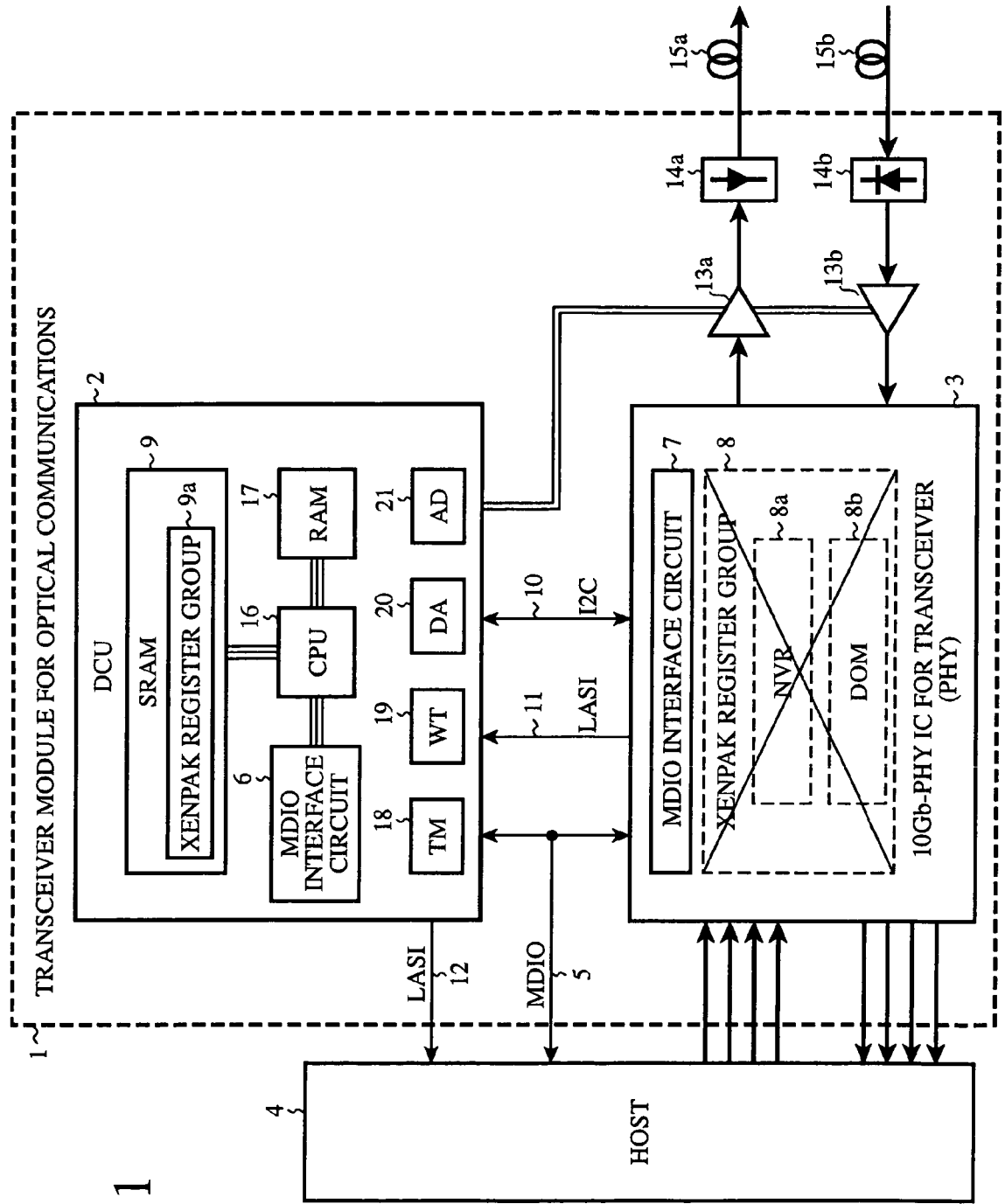
FIG. 1 is a diagram showing the structure of a transceiver module in accordance with embodiment 1 of the present invention.

FIG. 1 is a diagram for explaining the structure of a transceiver module in accordance with embodiment 1 of the present invention, and alarm signal control processing carried out by the transceiver module, and shows, as an example, an optical-communications transceiver module for 10 G-bit Ethernet (registered trademark) compliant with the IEEE802.3ae standard. The transceiver module 1 for optical communications in accordance with this embodiment is roughly divided into a DCU 2 and a 10 Gb-PHY IC (referred to as a PHY IC from here on) 3 for transceiver.

The DCU (i.e., a control integrated circuit) 2 and PHY IC (i.e., a physical-layer integrated circuit) 3 are connected to each other via a bus 10 for general-purpose serial interface, e.g., an I2C (Inter-Integrated Circuit) serial bus. The DCU 2 and PHY IC 3 can access each other's LASI_Status registers by way of this bus 10 for general-purpose serial interface. In the DCU 2 and PHY IC 3, MDIO (Management Data Input/Output) interface circuits 6 and 7 compliant with the IEEE802.3ae establish a communication connection with a host 4 that is a higher-layer device, respectively.

The PHY IC 3 has an XENPAK register group (i.e., a physical-layer register unit) 8 in which an NVR register (referred to as NVR in the figure) 8a, a DOM register 8b, and a LASI register, etc., which are not shown, are disposed, these registers being compliant with the IEEE802.3ae standard, in addition to the MDIO interface circuit 7. When detecting an error, the PHY IC 3 sets an error bit corresponding to the event to an LASI_Status register of the XENPAK register group 8 included in the PHY IC 3. The PHY IC 3 simultaneously outputs an error signal which is called an LASI (Link Alarm Status Interrupt) (which is referred to as an LASI signal 11 from here on) and which is a digital signal for notifying the error to outside the transceiver module.

Since the XENPAK register group 8 is software-emulated by the DCU 2, the PHY IC 3 has a mode in which it does not make a reply to access to the XENPAK register group 8 by way of the MDIO interface 5 by the host 4. Thereby, when access to the XENPAK register of the transceiver-module 1 from the host 4 is made, a reply output from the PHY IC 3 can be prevented from colliding with a reply output from the DCU2. In the illustrated example, in order to show that the PHY IC 3 is placed in the mode, the XENPAK register group 8 of the PHY IC is enclosed by a dashed line, and a cross is added to the box of the XENPAK register group.

The DCU 2 includes the MDIO interface circuit 6, an SRAM 9, a CPU 16, a RAM 17, a timer (TM) 18, a watchdog timer (WT) 19, a digital-to-analog converter (DA) 20, and an analog-to-digital converter (AD) 21. An XENPAK register group (i.e., a control-side register unit) 9a having the same structure and function as those of the XENPAK register group 8 of the PHY IC 3 is implemented, via software which the CPU 16 executes, on the SRAM 9. In other words, the software emulates the XENPAK register group 8 of the PHY IC 3 as the XENPAK register group 9a.

The CPU (Central Processing Unit) 16 performs total control of the DCU 2 which is disposed as a microcomputer which embodies operations and peripheral functions. The RAM 17 is used for storing software programs which the CPU 16 executes, a work area, etc. The CPU 16 sets times to the timer 18 and watchdog timer 19, respectively, and controls the whole of the device by performing predetermined operations in response to interrupt requests outputted from the timer 18 and watchdog timer 19.

The transceiver module 1 in accordance with this embodiment is also provided with a laser 14a for transmission, and a light receiving element 14b, and can transmit and receive data to and from outside the transceiver-module via optical cables 15a and 15b using the laser and light receiving element. The PHY IC 3 furnishes data to be transmitted to the laser 14a for transmission by way of an amplifier 13a, and the light receiving element 14b furnishes received data to the PHY IC 3 by way of an amplifier 13b.

The DCU 2 monitors the temperature of the laser 14a for transmission, temperature of the transceiver module 1, a bias applied to the laser 14a for transmission, a bias applied to the light receiving element 14b, and a power supply voltage applied to the laser 14a for transmission, for example. The DCU 2 controls the bias applied to the laser 14a for transmission so that the output of the laser 14a for transmission is kept constant.

When detecting an error, the DCU 2 writes digital information (i.e., a bit value specifying the error) indicating the detection of the error into an LASI (Link Alarm Status Interrupt) register which is a component of the XENPAK register group 9a on the SRAM 9, which emulates the XENPAK register group 8. The host 4 reads the contents of this LASI register of the XENPAK register group 9a, and, when determining that it is unperferable that the transceiver module 1 will continue to operate, stops the operation of the transceiver module 1. To be more specific, when detecting the occurrence of an abnormality, the DCU 2 furnishes an LASI signal 12 for warning the host 4 of the occurrence of the error to the host 4. In response to the LASI signal, the host 4 refers to the XENPAK register group 9a of the DCU 2 by way of the MDIO interface 5 and then gets to know that the error has been detected. The LASI signal 12 is a digital signal for specifying the error which is expressed in a form suitable for recognition by the host 4, for example, and which is detected by the transceiver module 1.

Next, the software emulation of the XENPAK register by the DCU in accordance with this embodiment will be explained. In the transceiver module 1, the MDIO interface circuit 6 of the DCU 2 and MDIO interface circuit 7 of the PHYIC3 are connected to the host 4 by way of the MDIO interface 5. Thereby, the host 4 can access the XENPAK register groups 9a and 8 respectively disposed in the DCU 2 and PHY IC 3 by way of the MDIO interface 5.

When the DCU 2 is software-emulating the XENPAK register group 8 of the PHY IC 3, the transceiver module 1 in accordance with this embodiment places the PHY IC 3 in a mode in which even if it receives access to the XENPAK register group 8 of the PHY IC 3 by an external device, such as the host 4, it does not make a reply to the access.

To be more specific, when software-emulating the XENPAK register group 8 of the PHY IC 3, the DCU 2 sets the MDIO interface circuit 7 of the PHY IC 3 to a state in which it intercepts a reply to access to the XENPAK register group 8 by the host 4 by way of the I2C serial bus 10.

Thereby, when the host 4 accesses to the XENPAK register groups 8 and 9a, since a reply output from the existing XENPAK register group 8 in the PHY IC 3 is intercepted by the MDIO interface circuit 7, it does not mingle with a reply output from the XENPAK register group 9a on the DCU 2 which emulates the XENPAK register group 8.

Next, the description is directed to a function of canceling a contradiction between the contents of the LASI_Status register of the XENPAK register group 8 in the PHY IC 3, and those of the LASI_Status register of the XENPAK register group 9a on the SRAM 9 in the DCU 2 which software-emulates the XENPAK register group 8, which is caused by the occurrence of a certain event (i.e., the occurrence of an error event).

First, since there is a difference between processing which the DCU 2 takes charge of and processing which the PHY IC 3 takes charge of, a high-speed error flag associated with communications processing is enabled in the LASI_Status register included in the PHY IC 3 while a low-speed error flag associated with internal processing, such as monitoring of the laser 14*a* for transmission, is enabled in the LASI_Status register included in the DCU 2.

Then, when a high-speed error event occurs, the PHY IC 3 detects the error and sets an error bit corresponding to the error event to the LASI_Status register of the XENPAK register group 8 included in the PHY IC 3. The PHY IC 3 simultaneously outputs the LASI signal 11 which is a digital signal for notifying the error to outside the transceiver module to the DCU 2.

The DCU 2 accepts the LASI signal 11 via an internal external interruption terminal or the like, and specifies the occurrence of the error event detected by the PHY IC 3. Then, the DCU2 generates a secondary LASI signal 12 about the error which the PHY IC 3 has detected, and outputs the secondary LASI signal to the host 4. As a result, the host 4 is notified of the error event about the error which the PHYIC3 has detected by the DCU 2.

At the same time when the DCU 2 notifies the error event to the host 4, the DCU 2 copies the contents of the LASI_Status register of the PHY IC 3 to the LASI_Status register thereof which emulates the LASI_Status register of the PHY IC 3 by way of the I2C interface 10. It is assumed that the PHY IC 3 has a function of being able to access interrelated registers which are included in either the XENPAK register group 8 or at least IEEE registers and the XENPAK registers by way of the 12C interface 10.

The transceiver module can thus make the contents of the DCU_LASI_Status register of the DCU 2 and those of the PHY_LASI_Status register of the PHY IC 3 match with each other, thereby preventing a contradiction from arising between the contents of these registers.

In order to access the contents of the interrelated registers which are included in the IEEE registers and XENPAK registers when reading the contents of the LASI_Status register of the PHY IC 3, the DCU 2 can have a mirror register (i.e., a dedicated register) collectively having the register bits of the interrelated registers in the PHY IC 3.

Thereby, the DCU 2 has only to read the contents of the mirror register collectively having the register bits of the interrelated registers, so that the DCU can read the contents of the LASI_Status register of the PHY IC 3 at a higher speed.

As mentioned above, the transceiver in accordance with this embodiment 1 is provided with the PHY IC 3 having the XENPAK register group 8 including the LASI_Status register to which a bit value indicating the occurrence of an error is set, and the DCU 2 having the XENPAK register group 9*a* which emulates the structure and function of the XENPAK register group 8, and the PHY IC 3 has an operation mode in which it does not output any reply to access to the XENPAK register group 8 by the host 4 while the DCU 2 emulates the structure and function of the XENPAK register group 8. When the host 4 accesses to the XENPAK register group, a reply output from the XENPAK register group 8 in the existing PHY IC 3 can be prevented from colliding (or mingling) with a reply output from the XENPAK register group 9*a* of the DCU 2 which emulates that of the PHY IC 3.

In addition, the PHY IC 3 outputs the error signal for specifying the detected error to the DCU 2, and the DCU2 specifies the error detected by the PHY IC 3 based on the error signal, notifies the host 4 of the occurrence of the error, and writes the contents of the LASI_Status register in the XENPAK register group 8 into the LASI_Status register of the XENPAK register group 9*a* which emulates the XENPAK register group 8. Therefore, the transceiver module can cancel a mismatch between the contents of the registers in the PHY IC 3 and those in the DCU 2, which is caused by the occurrence of a high-speed error which is detected only by the PHY IC 3 and which is associated with communications processing and occurrence of a low-speed error which is detected only by the DCU 2 and which is associated with internal processing such as monitoring of the laser for transmission.

Many widely different embodiments of the present invention may be constructed without departing from the spirit and scope of the present invention. It should be understood that the present invention is not limited to the specific embodiments described in the specification, except as defined in the appended claims.

What is claimed is:

1. A transceiver module comprising:
   a physical-layer integrated circuit comprising a physical-layer register unit including an error flag register in which a bit value indicating detection of an error in the transceiver is set and an interface circuit;
   a control integrated circuit including a microcomputer controlling the control integrated circuit and a control-side register unit emulating the structure and function of said physical-layer register unit; and
   a bus connecting said physical-layer integrated circuit to said control integrated circuit wherein, when said control integrated circuit emulates said physical-layer integrated circuit, said control integrated circuit sets said interface circuit through said bus, thereby controlling said physical-layer integrated circuit so that said physical-layer integrated circuit does not reply to an access request from a host, which is external to said physical-layer integrated circuit and said control integrated circuit, and said control integrated circuit replies to the access request.

2. The transceiver module according to claim 1, wherein said physical-layer integrated circuit outputs an error signal specifying a detected error to said control integrated circuit, and said control integrated circuit specifies the error detected by said physical-layer integrated circuit, based on the error signal, and writes contents of said error flag register of said physical-layer integrated circuit into a control integrated circuit error flag register, which emulates said error flag register of said physical-layer integrated circuit, and gives notification of the occurrence of the error to the host.

3. The transceiver module according to claim 2, wherein contents of registers which constitute said physical-layer register unit are set, and said control integrated circuit includes a dedicated register to which said control integrated circuit refers when writing the contents of said error flag register of said physical-layer integrated circuit into said control integrated circuit error flag register which emulates said error flag register unit of said physical-layer integrated circuit.

* * * * *